US009162540B2

United States Patent
Shin

(10) Patent No.: US 9,162,540 B2
(45) Date of Patent: Oct. 20, 2015

(54) APPARATUS FOR TIRE PRESSURE MONITORING, INFORMATION TRANSMISSING METHOD THEREOF AND INTEGRATED RECEIVER SYSTEM

(71) Applicant: HYUNDAI MOBIS Co., Ltd., Seoul (KR)

(72) Inventor: Kyu Chul Shin, Seoul (KR)

(73) Assignee: HYUNDAI MOBIS CO., LTD., Yongin-Si (KR)

( * ) Notice: Subject to any disclaimer, the term of this patent is extended or adjusted under 35 U.S.C. 154(b) by 180 days.

(21) Appl. No.: 13/935,054

(22) Filed: Jul. 3, 2013

(65) Prior Publication Data

US 2014/0085067 A1    Mar. 27, 2014

(30) Foreign Application Priority Data

Sep. 21, 2012 (KR) .................. 10-2012-0105338

(51) Int. Cl.
*G08B 21/00* (2006.01)
*B60C 23/02* (2006.01)

(52) U.S. Cl.
CPC ...................................... *B60C 23/02* (2013.01)

(58) Field of Classification Search
CPC ..................................................... B60C 23/02
USPC .................. 340/442–448; 73/146, 146.5
See application file for complete search history.

(56) References Cited

U.S. PATENT DOCUMENTS

| 6,486,773 B1* | 11/2002 | Bailie et al. ................... 340/445 |
| 6,894,600 B2* | 5/2005 | Phelan ....................... 340/10.34 |
| 7,224,269 B2 | 5/2007 | Miller et al. |
| 2003/0122660 A1 | 7/2003 | Kachouh et al. |
| 2006/0071768 A1 | 4/2006 | Iwazumi et al. |

FOREIGN PATENT DOCUMENTS

| DE | 600 21 441 T2 | 5/2006 |
| DE | 102 95 892 T5 | 6/2006 |
| DE | 10 2006 009 899 A1 | 9/2007 |
| DE | 11 2006 000 050 T5 | 10/2007 |
| EP | 1 419 906 A1 | 5/2004 |
| JP | 2000-203218 A | 7/2000 |
| JP | 2004-242323 A | 8/2004 |
| JP | 2012-101709 A | 5/2012 |
| KR | 10-2010-0008902 A | 1/2010 |

* cited by examiner

*Primary Examiner* — Jeffery Hofsass
(74) *Attorney, Agent, or Firm* — NSIP Law

(57) ABSTRACT

Provided are a tire pressure monitoring device, an information transmitting method thereof, and an integrated receiver system. A tire pressure monitoring device according to an aspect of the present invention includes a first sensing unit sensing a pressure of a tire, a second sensing unit detecting whether a vehicle is driving by sensing at least one of acceleration, motion, and shock, and a calculation unit transmitting, to an integrated system of the vehicle, pressure information of the tire at a first data transfer rate corresponding to a data transfer rate of a body control module or a smart key system when the second sensing unit detects that the vehicle is not driving.

10 Claims, 2 Drawing Sheets

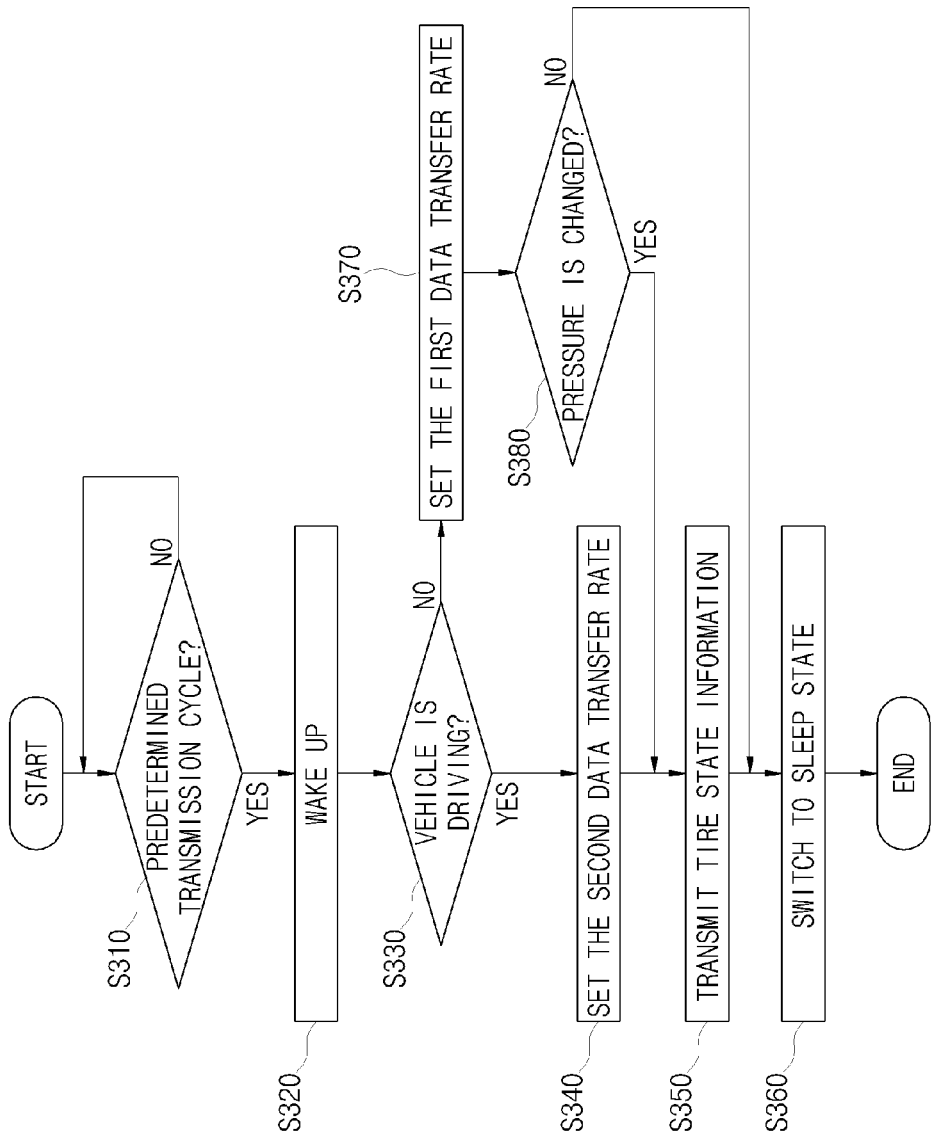

APPARATUS FOR TIRE PRESSURE MONITORING, INFORMATION TRANSMISSING METHOD THEREOF AND INTEGRATED RECEIVER SYSTEM

CROSS-REFERENCE TO RELATED APPLICATIONS

This application claims priority under 35 U.S.C. §119 to Korean Patent Application No. 10-2012-0105338, filed on Sep. 21, 2012, the disclosure of which is incorporated herein by reference in its entirety.

TECHNICAL FIELD

The present invention relates to a wireless communication method, and in particular, to a tire pressure monitoring device for transmitting/receiving wireless signals at a plurality of transfer rates, an information transmitting method thereof, and an integrated receiver system.

BACKGROUND

Recently, wireless communication devices such as remote controllers (for body control modules (BCMs), or smart key systems (SMKs)), and tire pressure monitoring systems (TPMSs) have been widely applied to vehicles.

There has been an increase of using a single radio frequency (RF) module (integrated receiver system) for devices using the same frequency band such as a tire pressure monitoring device and a remote controller.

To this end, an integrated receiver system uses the same transmission frequency and data transfer rate as the tire pressure monitoring device and remote controller to receive signals therefrom and decode the received signals.

SUMMARY

Accordingly, the present invention provides a tire pressure monitoring device for transmitting/receiving tire state information at different transfer rates according to a vehicle speed, an information transmitting method thereof, and an integrated receiver system.

In one general aspect, a tire pressure monitoring device includes a first sensing unit sensing a pressure of a tire, a second sensing unit detecting whether a vehicle is driving by sensing at least one of acceleration, motion, and shock, and a calculation unit transmitting, to an integrated system of the vehicle, pressure information of the tire at a first data transfer rate corresponding to a data transfer rate of a body control module or a smart key system when the second sensing unit detects that the vehicle is not driving.

In another general aspect, an integrated receiver system includes a receiving unit receiving a signal of a transmission frequency, a converting unit converting the received signal to information data according to a first data transfer rate when a vehicle is not driving and converting the received signal to the information data according to a second data transfer rate that is faster than the first data transfer rate when the vehicle is driving, and a processing unit performing an operation corresponding to the information data.

Other features and aspects will be apparent from the following detailed description, the drawings, and the claims.

BRIEF DESCRIPTION OF THE DRAWINGS

FIG. 3 is a flowchart illustrating the method for transmitting tire state information according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, a tire pressure monitoring device transmits tire state information while a vehicle is driving and not driving, and a vehicle remote controller (smart key and remote controller) transmits a signal for remotely controlling the vehicle while the vehicle is not driving.

Therefore, an integrated system according to the related art, which communicates with the devices, is operated in a mode for receiving a tire pressure monitoring signal while a vehicle is driving. And the integrated system is operated in a mode for scanning the tire pressure monitoring signal and a mode for scanning a vehicle remote control signal while a vehicle is not driving. Accordingly, the integrated system according to the related art consumes a lot of power due to the necessary scan modes.

However, an integrated system according to an embodiment of the present invention may receive the tire pressure monitoring signal and the vehicle remote control signal in a single scan mode, and thus power consumption may be reduced in comparison with the related art.

Figure 1:
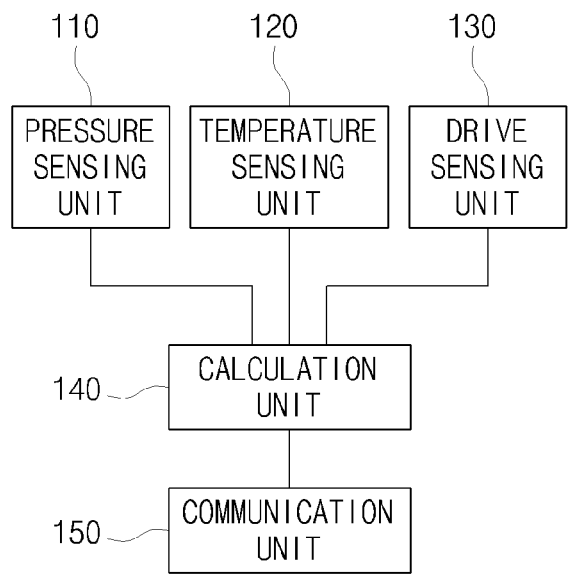
FIG. 1 is a block diagram illustrating a tire pressure monitoring device according to an embodiment of the present invention.

Hereinafter, embodiments of the present invention will be described in detail with reference to the accompanying drawings. FIG. 1 is a block diagram illustrating a tire pressure monitoring device according to an embodiment of the present invention.

As illustrated in FIG. 1, a tire pressure monitoring device 10 according to an embodiment of the present invention includes a pressure sensing unit 110, a temperature sensing unit 120, a drive sensing unit 130, a calculation unit 140, and a communication unit 150.

The pressure sensing unit 110 may be a pressure sensor for sensing a pressure of a tire.

The temperature sensing unit 120 may be a temperature sensor for sensing a temperature of a tire. Here, in the case where the tire pressure monitoring device 10 is configured to transmit only tire pressure information, the temperature sensing unit 120 may be omitted.

The drive sensing unit 130 detects whether a vehicle is driving using at least one of acceleration, shock, and motion and notifies a detection result to the calculation unit 140.

When the drive sensing unit 130 detects that the vehicle is not driving, the calculation unit 140 generates tire state information including at least one of a pressure and a temperature of a tire according to a first data transfer rate. Herein, the first data transfer rate may be a data transfer rate (e.g. 2.5 kbps) corresponding to a data transfer rate of a body control module or a smart key system.

Here, when the vehicle is not driving, the calculation unit 140 may be woken up at a predetermined transmission cycle, generate the tire state information, and switch to a sleep state after transferring the tire state information to the communication unit 150.

Alternatively, the calculation unit 140 may be woken up at a predetermined transmission cycle, check at least one of the pressure and the temperature of the tire, and generate the tire state information only when the tire pressure is outside a first predetermined range or the tire temperature is outside a second predetermined range.

When the drive sensing unit 130 detects that the vehicle is driving, the calculation unit 140 transmits the tire state information at a second data transfer rate. Here, the second data transfer rate which is faster than the first data transfer rate may be a data transfer rate corresponding to a data transfer rate of a tire pressure monitoring system (TPMS) according to the related art.

Here, while the vehicle is driving, the calculation unit 140 may be woken up at a predetermined transmission cycle, check at least one of the pressure and the temperature of the tire, generate the tire state information, and switch to the sleep state after transferring the tire state information to the communication unit 150.

The calculation unit 140 may be provided with different first and second reference times from a transmission timer arranged inside or outside the calculation unit 140 to generate the tire state information at the first or second data transfer rate corresponding to the first or second reference time.

The communication unit 150 receives the tire state information from the calculation unit 140 and transmits the tire state information loading the tire state information on a transmission frequency.

As described above, according to the present invention, the tire pressure monitoring device may transmit the tire state information at different data transfer rates when the vehicle is driving and not driving. Further, according to the present invention, only one scan mode corresponding to the first data transfer rate is performed while the vehicle is not driving so as to receive signals from the tire pressure monitoring device and the vehicle remote controller. Therefore, according to the present invention, power consumption may be reduced in comparison with the integrated system of the related art, which is operated in an A scan mode for receiving a signal from a tire pressure monitoring device and a B scan mode for receiving a signal from a vehicle remote controller while a vehicle is not driving.

Figure 2:
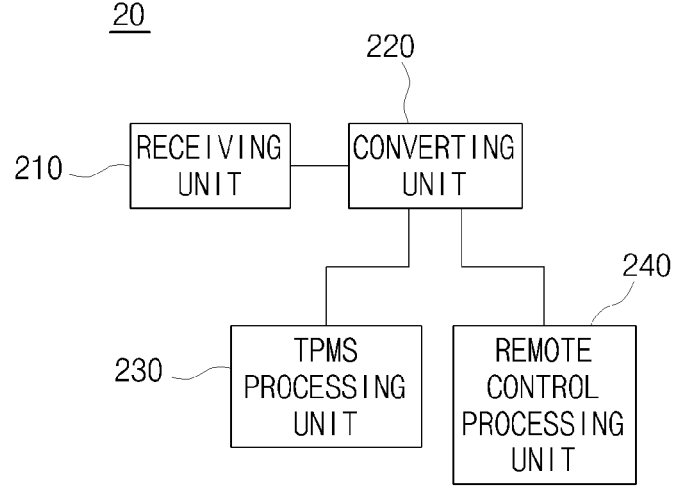
FIG. 2 is a block diagram illustrating an integrated receiver system according to an embodiment of the present invention.

Hereinafter, an integrated receiver system according to an embodiment of the present invention will be described with reference to FIG. 2. FIG. 2 is a block diagram illustrating the integrated receiver system according to an embodiment of the present invention.

As illustrated in FIG. 2, an integrated receiver system 20 includes a receiving unit 210, a converting unit 220, a TPMS processing unit 230, and a remote control processing unit 240.

The receiving unit 210 receives a signal of a transmission frequency from at least one of the tire pressure monitoring device 10 and the remote controller (smart key or vehicle remote control key).

The converting unit 220 converts the received signal to information data according to the first or second data transfer rate.

The converting unit 220 determines whether a vehicle is driving or not driving using at least one of an ignition signal and a vehicle speed signal. The converting unit 220 converts the received signal to the information data according to the first data transfer rate while the vehicle is not driving, and converts the received signal to the information data according to the second data transfer rate while the vehicle is driving.

The TPMS processing unit 230 receives the information data that is the tire state information to identify at least one of the pressure and the temperature of the tire. The TPMS processing unit 230 performs a predetermined operation when the tire is abnormal, for example, when the time pressure is greater than a predetermined critical pressure or the tire temperature is greater than a predetermined critical temperature. Here, the predetermined operation may be warning a user of the abnormality of the tire.

The tire pressure monitoring device may transmit the tire state information only when the tire is abnormal. In this case, the TPMS processing unit 230 may perform only the predetermined operation corresponding to the case of occurrence of tire abnormality without additionally checking abnormality of the tire by the tire state information.

The remote control processing unit 240 receives the information data that is the remote control signal and identifies the content of the remote control signal to perform a vehicle controlling operation (e.g. opening a door of a vehicle, locking a door of a vehicle, panic control, turning on/off ignition, etc.) according to the content of the remote control signal.

Hereinafter, a method for transmitting tire state information according to an embodiment of the present invention will be described with reference to FIG. 3. FIG. 3 is a flowchart illustrating the method for transmitting tire state information according to an embodiment of the present invention.

Referring to FIG. 3, in operation S310, the tire pressure monitoring device 10 checks whether the predetermined transmission cycle arrives in the sleep state.

When the predetermined transmission cycle arrives, the tire pressure monitoring device 10 wakes up and is switched to an operation state in operation S320.

In the operation state, the tire pressure monitoring device 10 checks whether a vehicle is driving using at least one of the ignition signal and the vehicle speed signal in operation S330.

When the vehicle is driving, the tire pressure monitoring device 10 sets a data transfer rate to the second data transfer rate in operation S340. Here, the second data transfer rate may be a data transfer rate corresponding to a data transfer rate of a tire pressure monitoring device according to the related art.

Meanwhile, when the vehicle is not driving, the tire pressure monitoring device 10 sets a data transfer rate to the first data transfer rate in operation S370. Here, the first data transfer rate may be a data transfer rate corresponding to a data transfer rate of a remote controller of the related art.

The tire pressure monitoring device 10 loads the tire state information on a transmission frequency to transmit the tire state information at the first or second data transfer rate in operation S350.

In detail, when the vehicle is not driving, the tire pressure monitoring device 10 may load the tire state information on the transmission frequency in an amount corresponding to the first data transfer rate. When the vehicle is driving, the tire pressure monitoring device 10 may load the tire state information on the transmission frequency in an amount corresponding to the second data transfer rate.

When the transmission of the tire state information is completed, the tire pressure monitoring device 10 is switched to the sleep state and is maintained in the sleep state until a next transmission cycle arrives in operation S360.

As described above, the tire pressure monitoring device according to an embodiment of the present invention may transmit the tire state information at different data transfer rates when the vehicle is driving and not driving. Therefore, the integrated control system that communicates with the tire pressure monitoring device and the vehicle remote controller may reduce the power consumed for the information scanning, and thus a battery life may be extended.

According to the present invention, when a vehicle is not driving, RF signals of a tire pressure monitoring system, a body control module, or a smart key system can be simultaneously transmitted/received.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A tire pressure monitoring device comprising:
   a first sensing unit sensing a pressure of a tire;
   a second sensing unit detecting whether a vehicle is driving by sensing at least one of acceleration, motion, and shock; and
   a calculation unit transmitting, to an integrated system of the vehicle, pressure information of the tire at a first data transfer rate corresponding to a data transfer rate of one or more controllers transmitting signaling of at least a pair of tire pressure monitoring, motion control, safety status and access of the vehicle when the second sensing unit detects that the vehicle is not driving.

2. The tire pressure monitoring device of claim 1, wherein the calculation unit transmits the pressure information of the tire at a second data transfer rate that is faster than the first data transfer rate when the second sensing unit detects that the vehicle is driving.

3. The tire pressure monitoring device of claim 1, wherein the calculation unit transmits the pressure information of the tire at the first data transfer rate if the pressure of the tire is changed to be equal to or greater than a predetermined critical value when the vehicle is not driving.

4. The tire pressure monitoring device of claim 1, wherein the calculation unit transmits the pressure information of the tire at the first data transfer rate at a predetermined transmission cycle and then is switched to a sleep state.

5. An integrated receiver system comprising:
   a receiving unit receiving a signal of a transmission frequency;
   a converting unit converting the received signal to information data according to a first data transfer rate when a vehicle is not driving and converting the received signal to the information data according to a second data transfer rate that is faster than the first data transfer rate when the vehicle is driving, the first data transfer rate being associated with one or more controller transmitting signaling of at least a pair of tire pressure monitoring, motion control, safety status and access of the vehicle; and
   a processing unit performing an operation corresponding to the information data.

6. The integrated receiver system of claim 5, wherein, when the vehicle is not driving, the received signal is a signal from a tire pressure monitoring system (TPMS), or a remote controller of the vehicle.

7. The integrated receiver system of claim 5, wherein, when the vehicle is driving, the received signal is a signal from a tire pressure monitoring system (TPMS).

8. The integrated receiver system of claim 6, wherein, when the received signal is the signal from the tire pressure monitoring system, the information data is tire pressure information, and the processing unit checks whether the tire is abnormal on the basis of the tire pressure information to give a warning when the tire is abnormal.

9. The integrated receiver system of claim 7, wherein, when the received signal is the signal from the tire pressure monitoring system, the information data is tire pressure information, and the processing unit checks whether a tire is abnormal on the basis of the tire pressure information to give a warning when the tire is abnormal.

10. The integrated receiver system of claim 5, wherein the receiving unit and the converting unit wake up at a predetermined cycle respectively to receive the signal of the transmission frequency and convert the received data to the information data and then are switched to a sleep state.

* * * * *